(12) United States Patent
Lee et al.

(10) Patent No.: US 9,892,313 B2
(45) Date of Patent: Feb. 13, 2018

(54) ELECTRONIC DEVICE AND CONTROL METHOD THEREOF

(71) Applicant: LG ELECTRONICS INC., Seoul (KR)

(72) Inventors: Sanghyuck Lee, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/906,160

(22) PCT Filed: Dec. 3, 2013

(86) PCT No.: PCT/KR2013/011092
§ 371 (c)(1),
(2) Date: Jan. 19, 2016

(87) PCT Pub. No.: WO2015/012449
PCT Pub. Date: Jan. 29, 2015

(65) Prior Publication Data
US 2016/0171289 A1    Jun. 16, 2016

(30) Foreign Application Priority Data
Jul. 26, 2013   (KR) .................. 10-2013-0089097

(51) Int. Cl.
*G06K 9/00*  (2006.01)
*G06F 3/14*  (2006.01)
(Continued)

(52) U.S. Cl.
CPC .......... *G06K 9/00288* (2013.01); *G06F 1/16* (2013.01); *G06F 1/163* (2013.01); *G06F 3/01* (2013.01);
(Continued)

(58) Field of Classification Search
CPC ............ G06K 9/00362; G06K 9/00288; G06F 1/163; G06F 3/01; G06F 3/011;
(Continued)

(56) References Cited

U.S. PATENT DOCUMENTS 9,280,887 B2 *  3/2016  Son ..................... G02C 11/10
9,353,965 B1 *  5/2016  Goyal ................. F24F 11/0086
(Continued)

FOREIGN PATENT DOCUMENTS

| KR | 10-2008-0050991 A | 6/2008 |
|---|---|---|
| KR | 10-2009-0076124 A | 7/2009 |
| KR | 10-2012-0008328 A | 1/2012 |

*Primary Examiner* — Ali Bayat
(74) *Attorney, Agent, or Firm* — Birch, Stewart, Kolasch & Birch, LLP

(57) ABSTRACT

Disclosed are a central control device capable of identifying a user and a control method thereof. According to an aspect of the present invention, there is provided an electronic device including: an electronic device body; an output unit disposed in the body and configured to output information; a sensing unit configured to sense a user's approach to the body; and a controller configured to identify the user whose approach has been sensed, and output information related to the identified user in a different manner according to a distance between the body and the user.

20 Claims, 17 Drawing Sheets

(51) Int. Cl.
*G06F 3/01* (2006.01)
*G06F 21/32* (2013.01)
*G06F 1/16* (2006.01)
*G06F 3/041* (2006.01)
*G06F 3/16* (2006.01)
*H04N 5/225* (2006.01)
*G09G 5/00* (2006.01)

(52) U.S. Cl.
CPC .............. *G06F 3/011* (2013.01); *G06F 3/012* (2013.01); *G06F 3/017* (2013.01); *G06F 3/0412* (2013.01); *G06F 3/14* (2013.01); *G06F 3/167* (2013.01); *G06F 21/32* (2013.01); *G06K 9/00362* (2013.01); *G09G 5/00* (2013.01); *H04N 5/225* (2013.01); *G09G 2340/14* (2013.01); *G09G 2354/00* (2013.01)

(58) Field of Classification Search
CPC ........ G06F 3/012; G06F 3/017; G06F 3/0412; G06F 3/14; G06F 3/167; G06F 21/32; G09G 2370/16; G09G 2354/00; G09G 5/00; G09G 5/003; H04N 5/225
See application file for complete search history.

(56) References Cited

U.S. PATENT DOCUMENTS

| | | | | |
|---|---|---|---|---|
| 9,530,302 | B2* | 12/2016 | Thomas | G08B 21/22 |
| 9,583,069 | B2* | 2/2017 | Son | G02C 11/10 |
| 9,606,552 | B2* | 3/2017 | Stefanski | G05D 23/27 |
| 2006/0190590 | A1 | 8/2006 | Kim | |
| 2007/0005822 | A1 | 1/2007 | Yamamoto et al. | |
| 2012/0013557 | A1 | 1/2012 | Lee et al. | |
| 2013/0127980 | A1* | 5/2013 | Haddick | G06F 3/013 348/14.08 |
| 2016/0301373 | A1* | 10/2016 | Herman | H03G 3/3005 |

* cited by examiner

[Fig. 1]
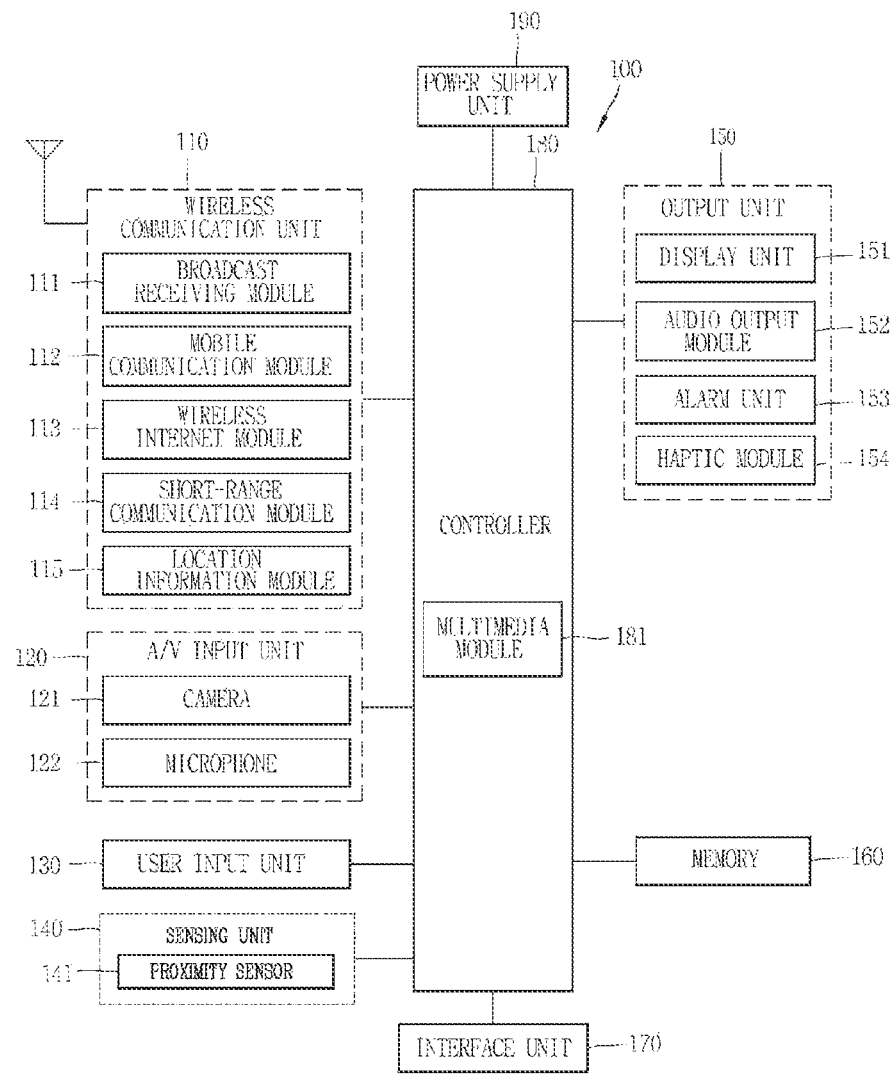
[Fig. 2]
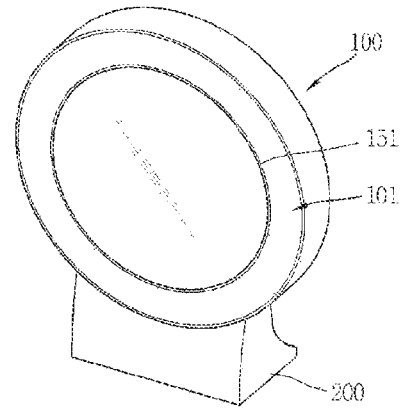

[Fig. 3]
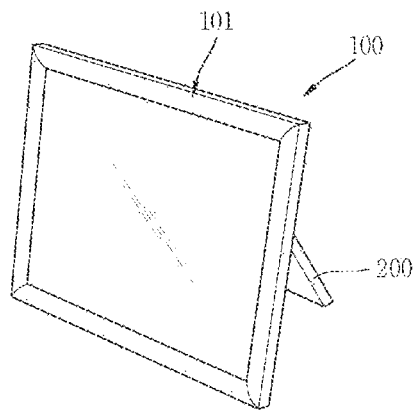
[Fig. 4]
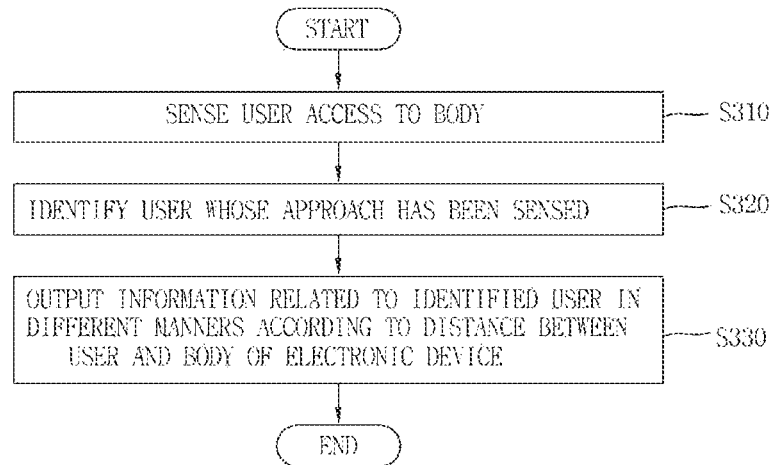

[Fig. 5]
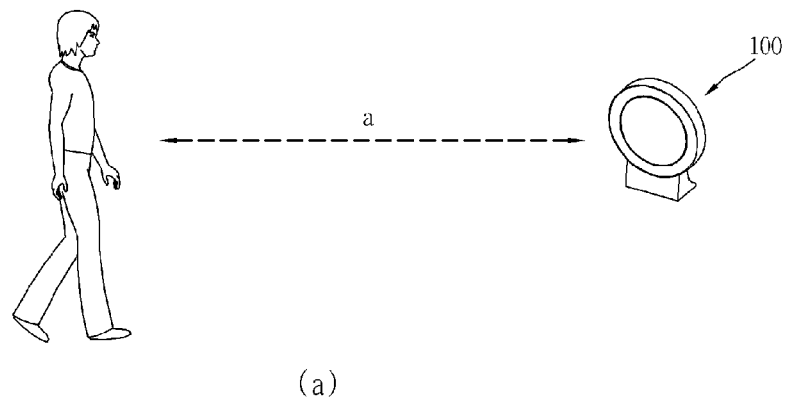
(a)
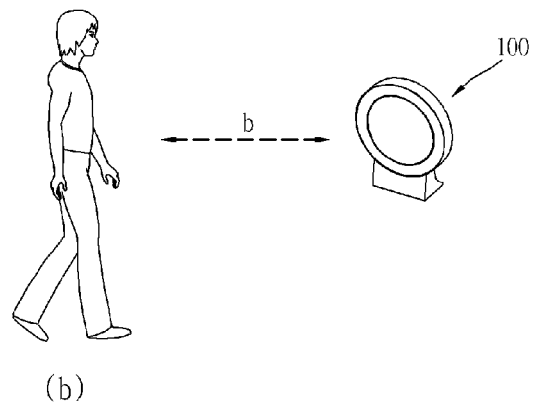
(b)
[Fig. 6a]
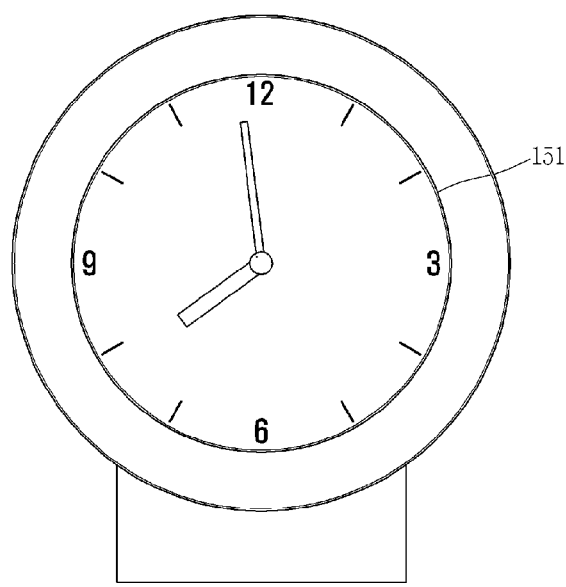

[Fig. 6b]
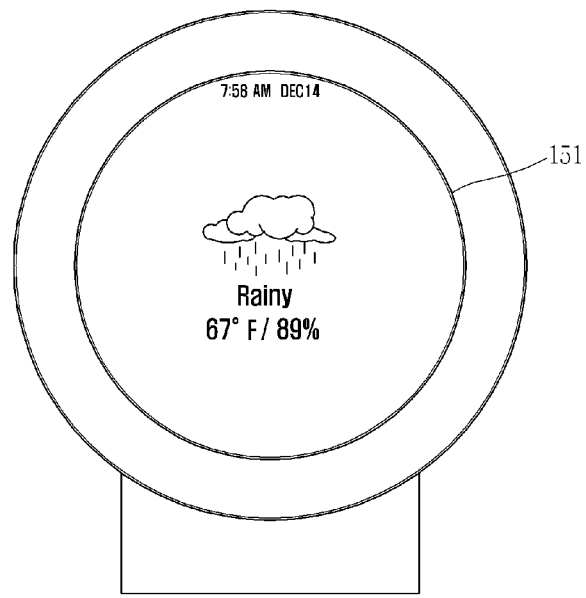
[Fig. 6c]
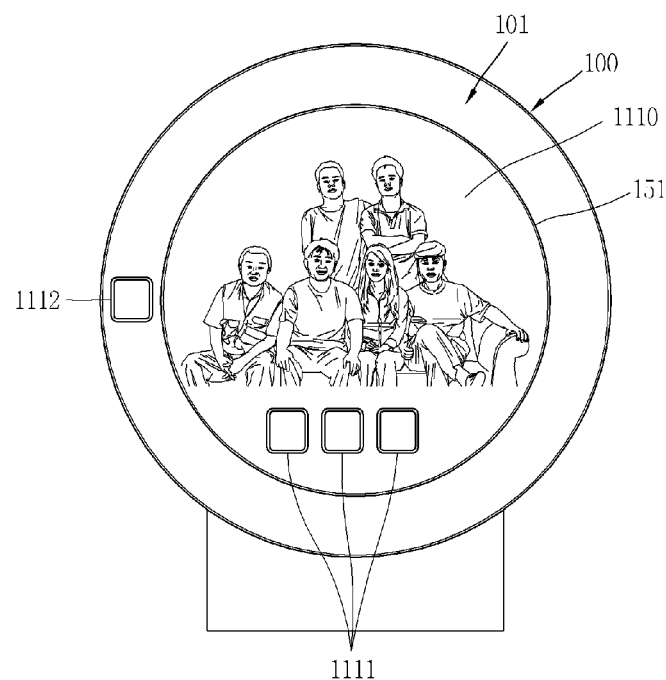

[Fig. 7a]
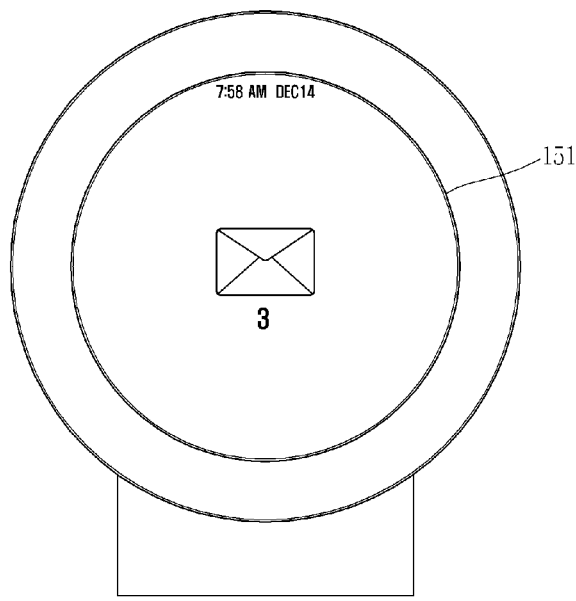
[Fig. 7b]
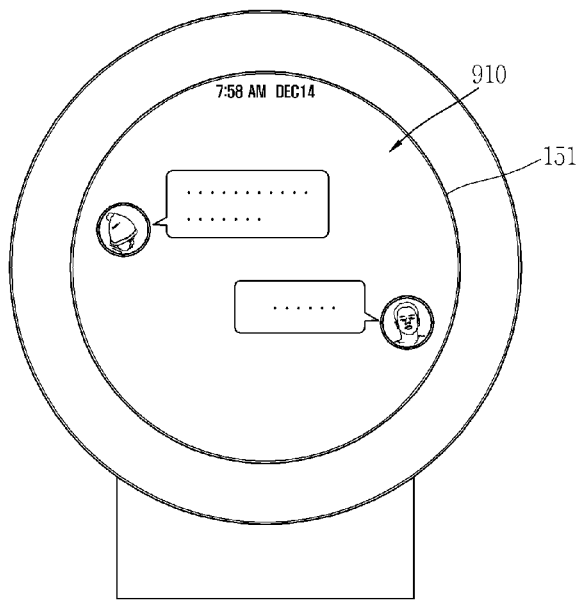

[Fig. 7c]
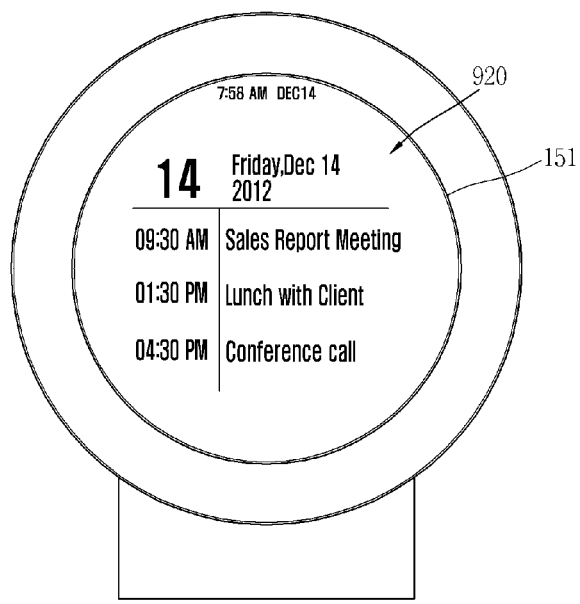

[Fig. 8]
(a)
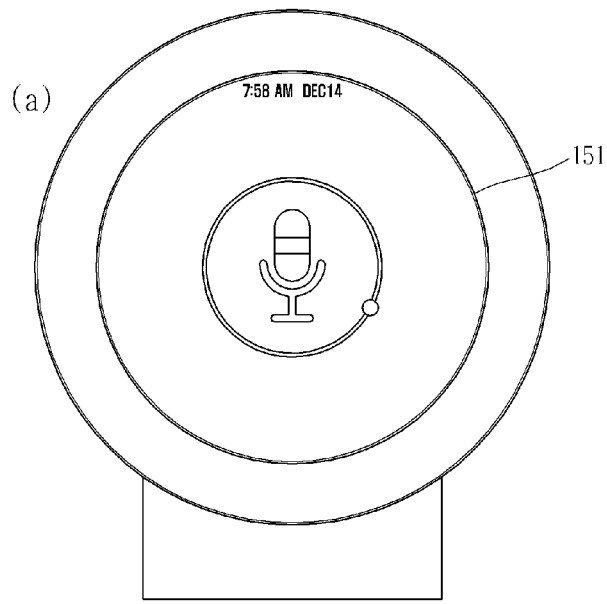
(b)
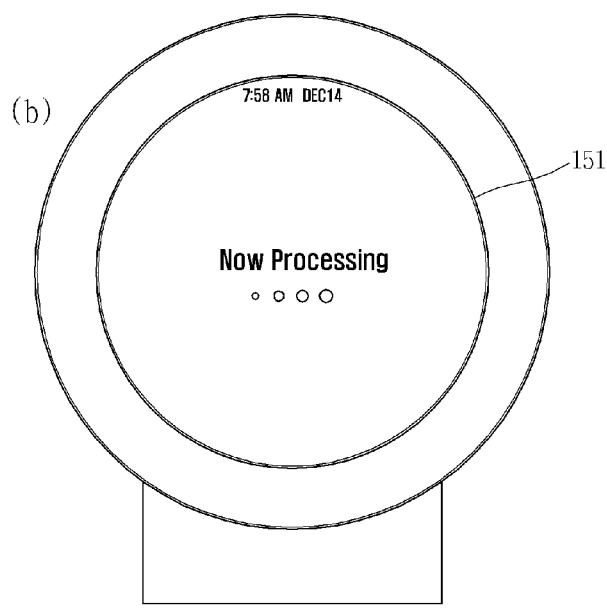

[Fig. 9a]
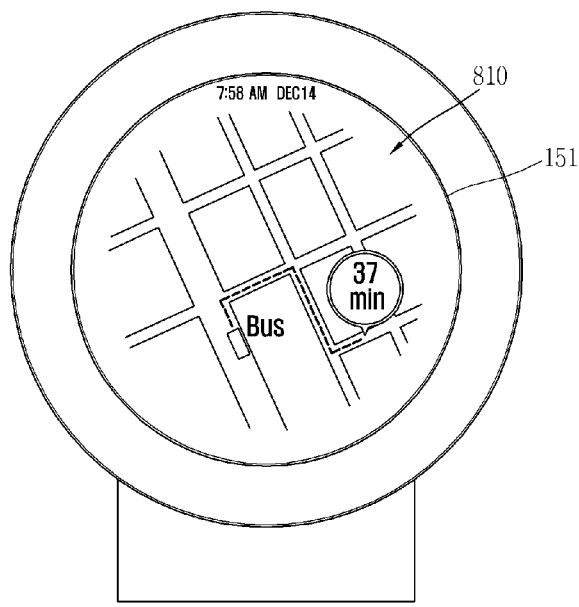
[Fig. 9b]
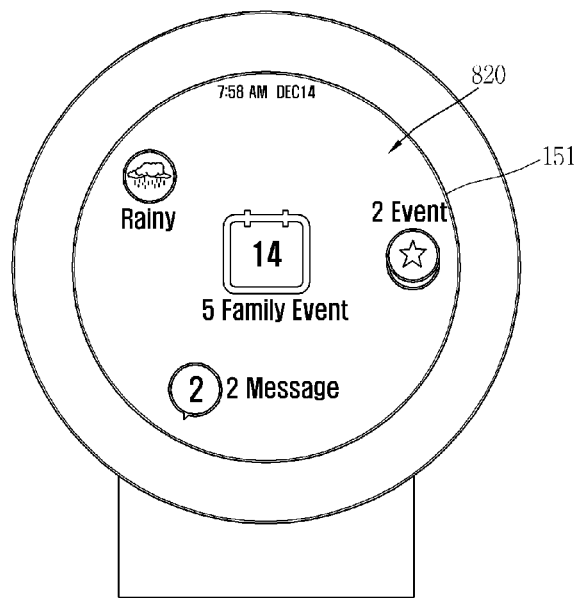

[Fig. 10a]
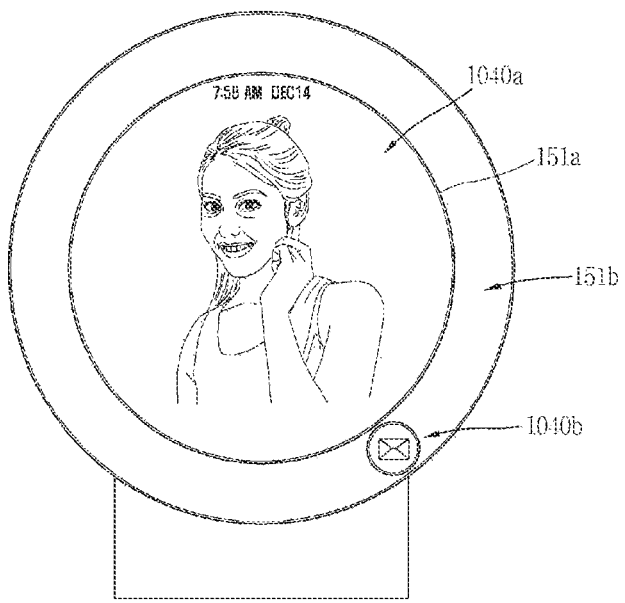
[Fig. 10b]
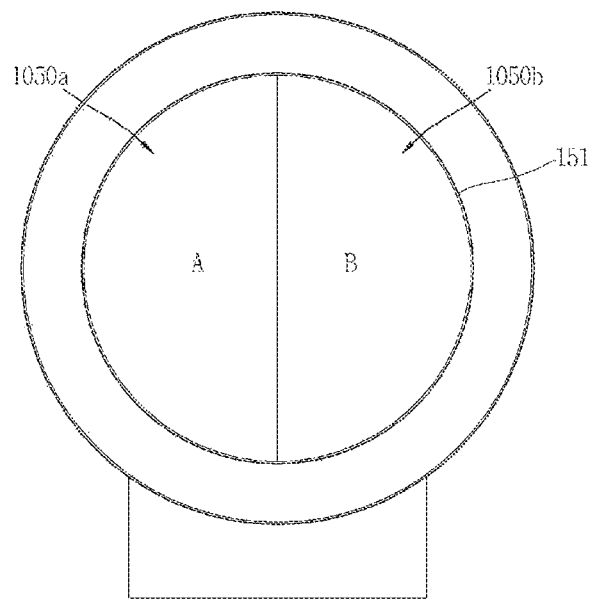

[Fig. 10c]
(a)
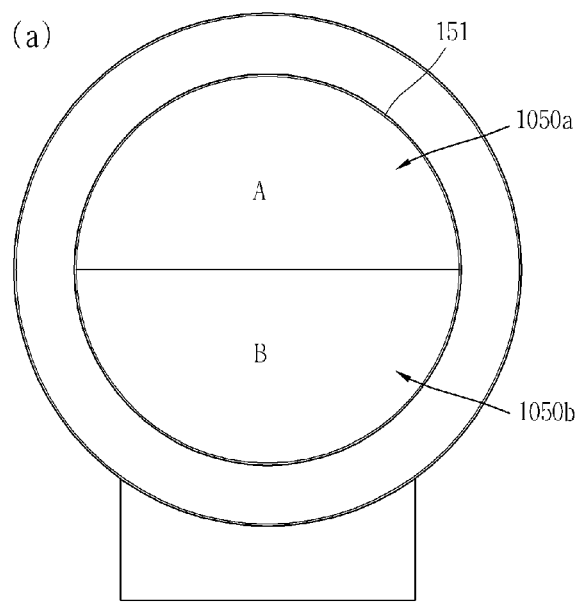
(b)
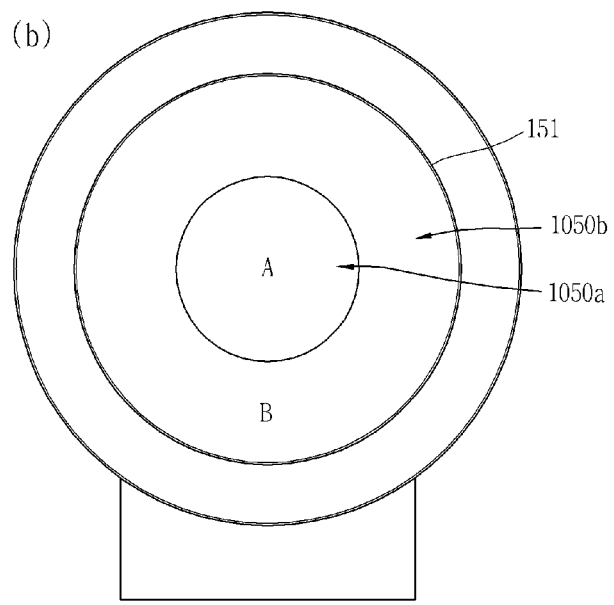

[Fig. 10d]
(a)
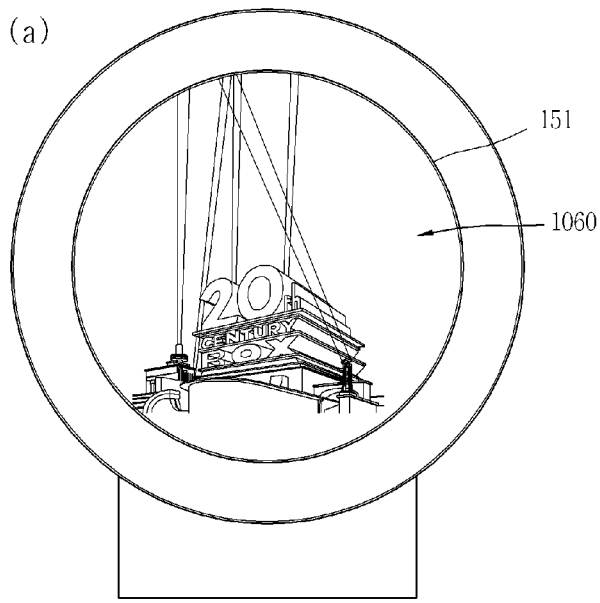
(b)
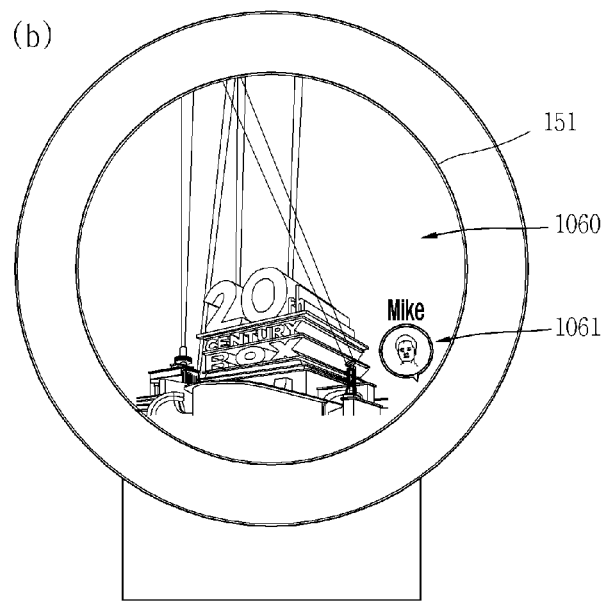

[Fig. 10c]
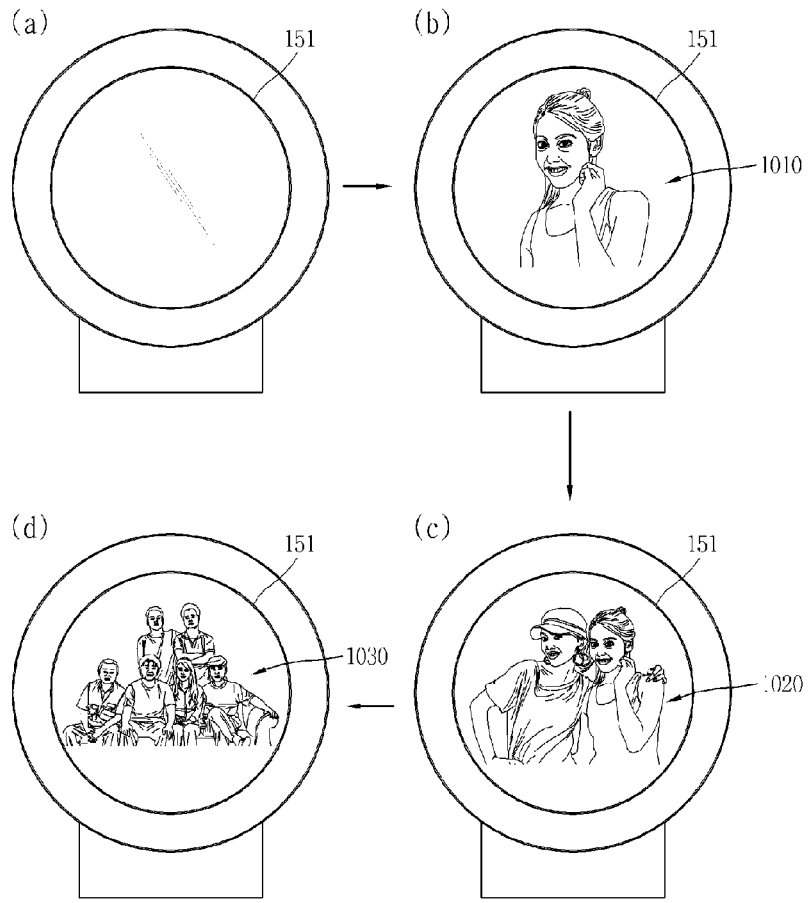
[Fig. 10f]
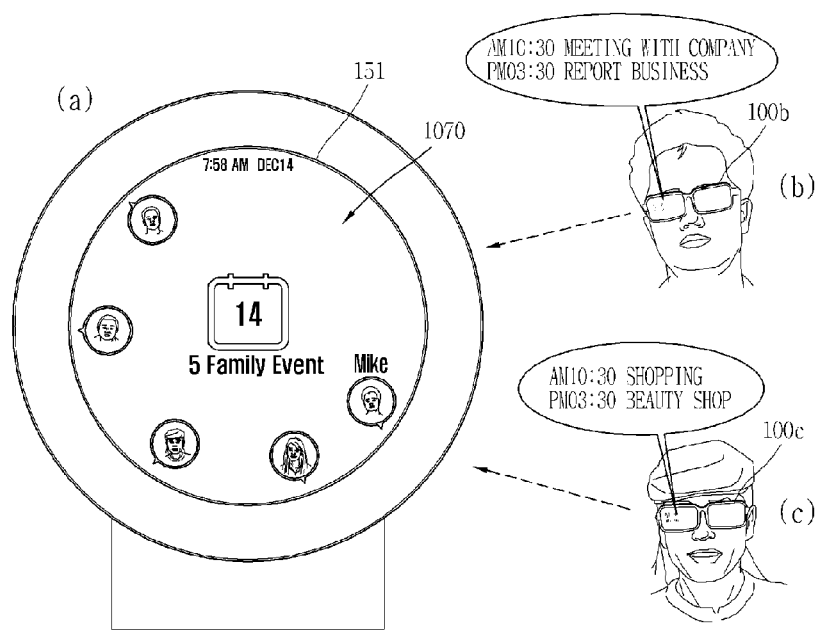

[Fig. 11a]
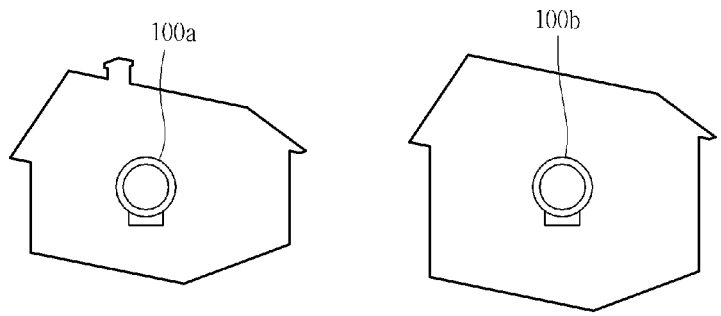
[Fig. 11b]
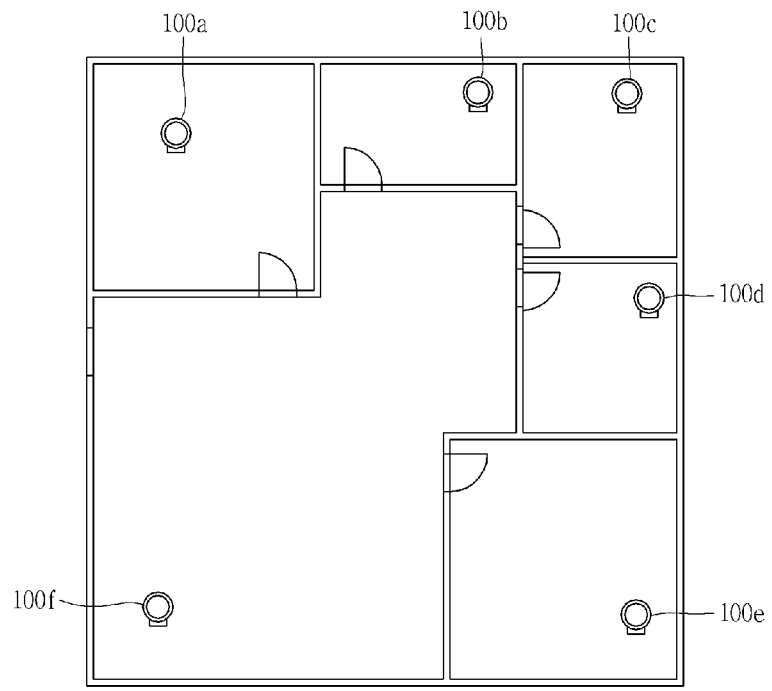

[Fig. 12a]
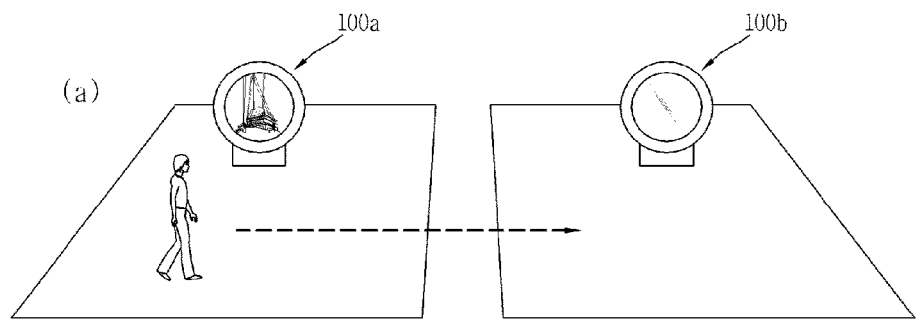
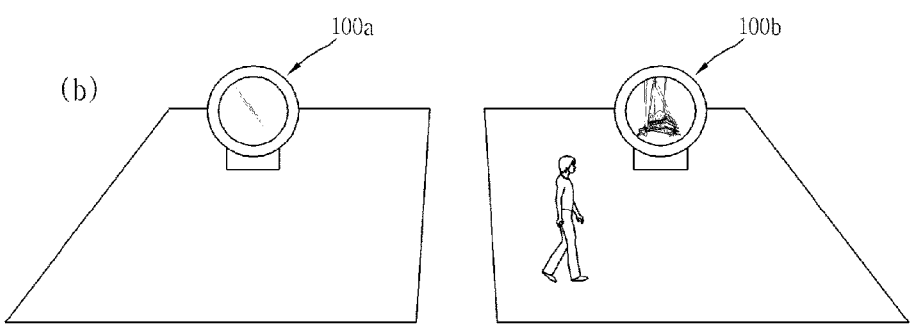
[Fig. 12b]
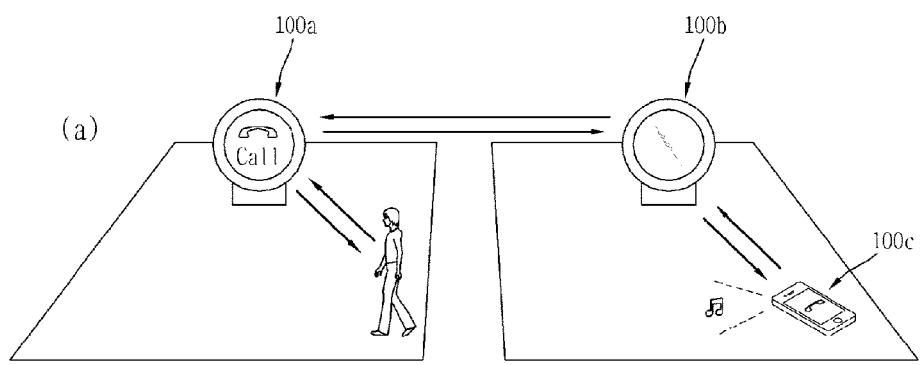

[Fig. 12c]
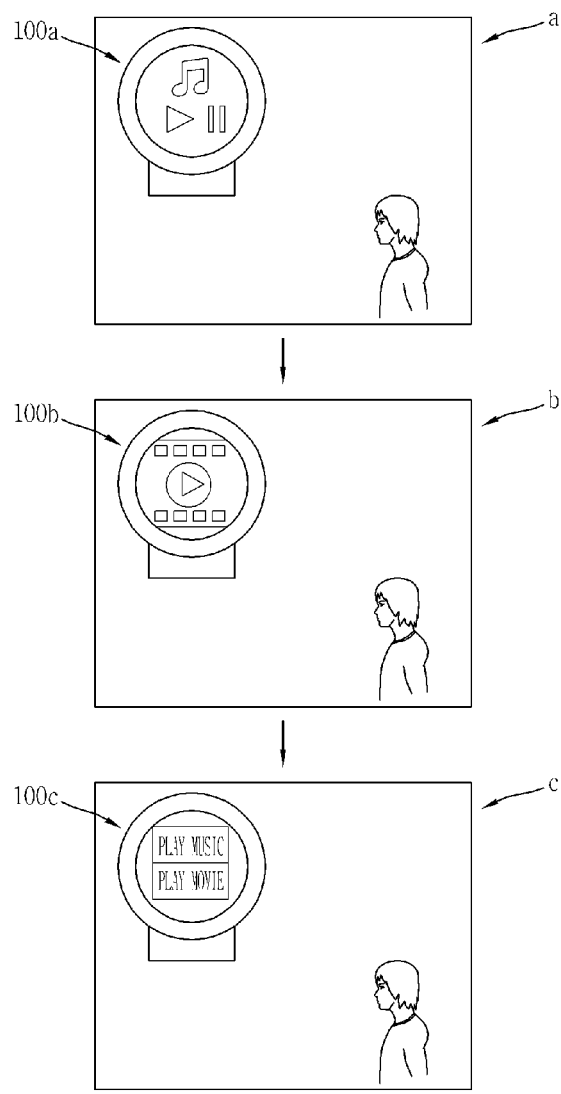

[Fig. 13a]
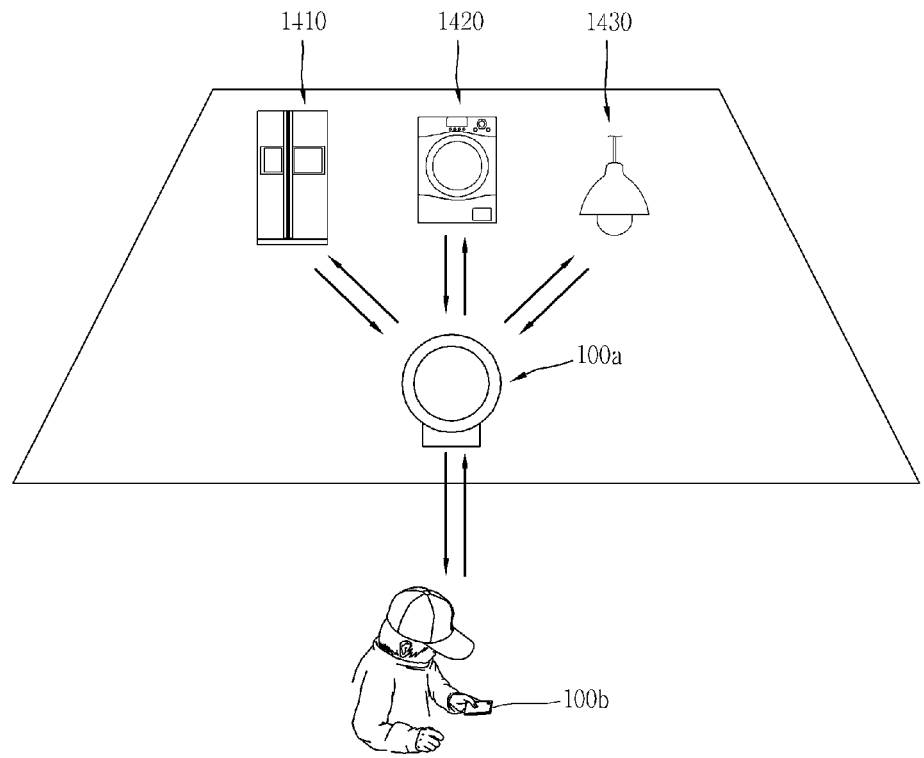
[Fig. 13b]
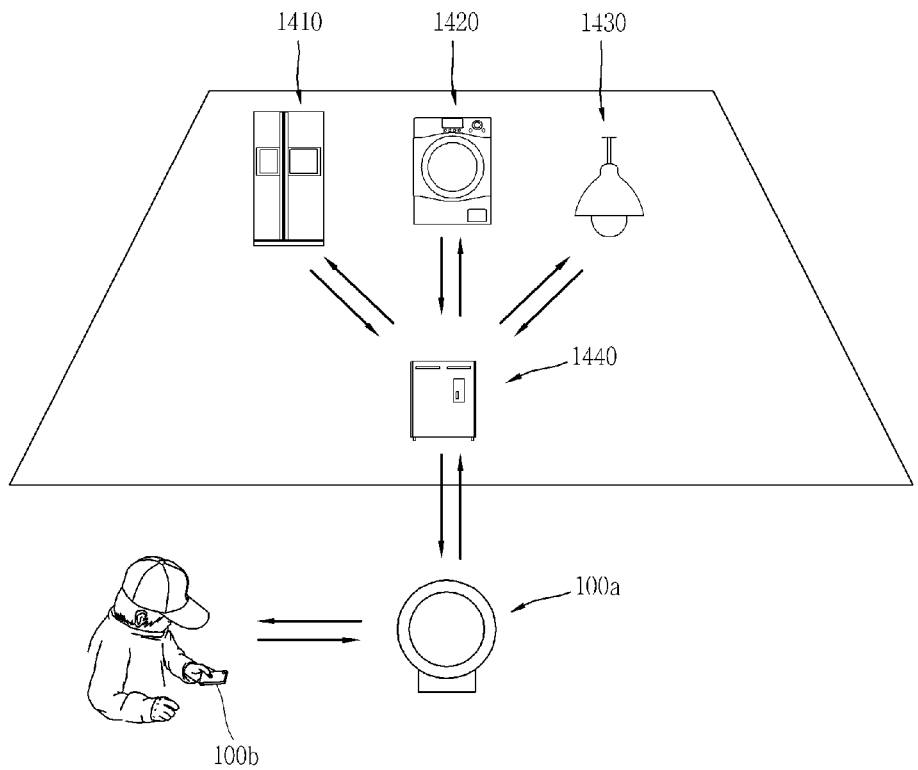

[Fig. 13c]
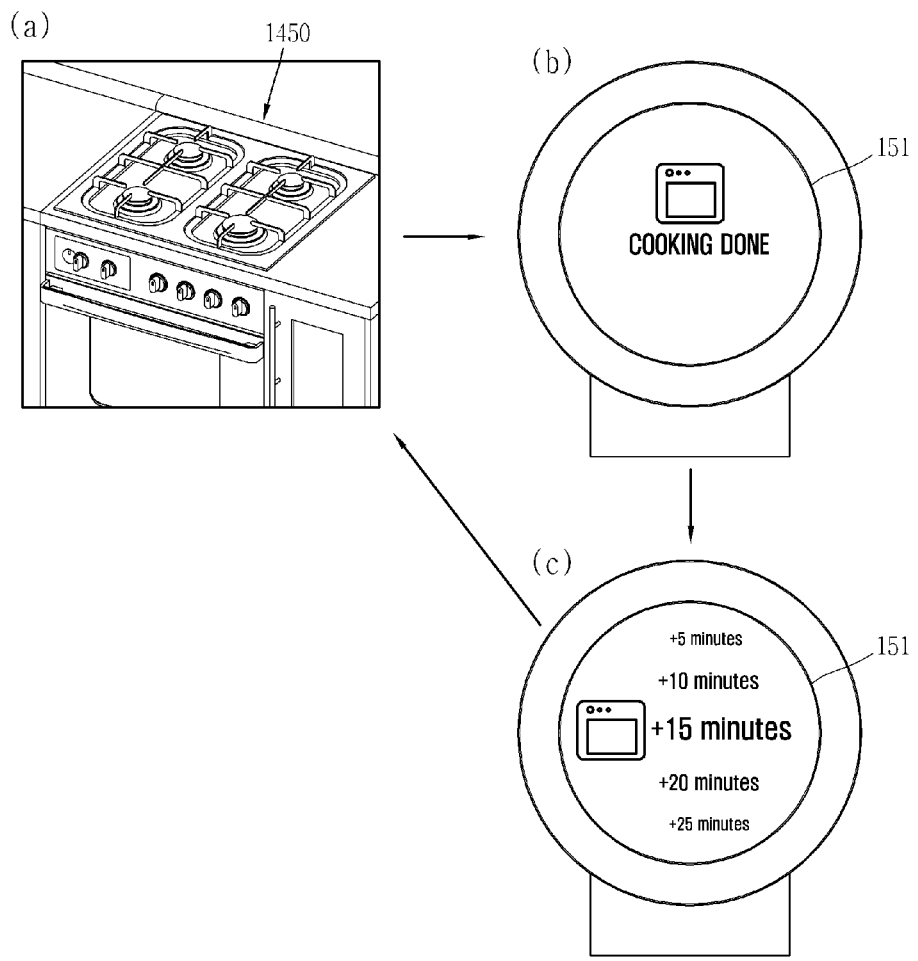

ELECTRONIC DEVICE AND CONTROL METHOD THEREOF

CROSS REFERENCE TO RELATED APPLICATIONS

This application is the National Phase of PCT International Application No. PCT/KR2013/011092, filed on Dec. 3, 2013, which claims priority under 35 U.S.C. 119(a) to Patent Application No. 10-2013-0089097, filed in the Republic of Korea on Jul. 26, 2013, which is hereby expressly incorporated by reference into the present application.

TECHNICAL FIELD

The present invention relates to a central control device capable of identifying a user and a control method thereof.

BACKGROUND ART

In general, electronic devices may be divided into a electronic device and stationary terminal according to whether or not terminals are movable. In addition, electronic devices may be divided into a handheld terminal and a vehicle mount terminal according to whether or not users can directly carry it around.

As such functions become more diversified, electronic devices can support more complicated functions such as capturing images or video, reproducing music or video files, playing games, receiving broadcast signals, and the like. By comprehensively and collectively implementing such functions, the electronic device may be embodied in the form of a multimedia player or device. Efforts are ongoing to support and increase the functionality of electronic devices. Such efforts include software and hardware improvements, as well as changes and improvements in the structural components which form electronic devices.

Also, recently, due to the development of the communication technologies, electronic devices or terminals included in spaces having a particular scale, such as homes, offices, or the like, may be connected via a network. This may be called a home network, and in a home in which a home network is established, electronic devices connected to the home network may be controlled by a central server.

SUMMARY OF THE INVENTION

Therefore, an object of the present invention is to provide an electronic device capable of providing customized information and a control method thereof.

According to an aspect of the present invention, there is provided an electronic device including: an electronic device body; an output unit disposed in the body and configured to output information; a sensing unit configured to sense a user's approach to the body; and a controller configured to identify the user whose approach has been sensed, and output information related to the identified user in a different manner according to a distance between the body and the user.

In an embodiment, the output unit may include a display unit and a speaker, and when a distance between the user and the body is equal to or longer than a reference distance, the controller may output the related information by using the speaker, and when a distance between the user and the body is shorter than the reference distance, the controller may output the related information by using at least one of the speaker and the display.

In an embodiment, when the user moves from a position within the distance between the user and the body which is equal to or longer than the reference distance to a position within the distance between the user and the body which is shorter than the reference distance, the information, which has been output through the speaker, may be output through the display unit or may be output through both the speaker and the display unit.

In an embodiment, the output unit may include a display unit, and information output to the display unit may vary according to a distance between the user and the body.

In an embodiment, the electronic device may further include a wireless communication unit which can communicate with at least one mobile terminal, wherein the information related to the identified user may include information received from a mobile terminal of the identified user.

In an embodiment, the output unit may include a display unit configured to output visual information, and the controller may also output information received from a mobile terminal of at least one different user, rather than the identified user, to the display unit.

In an embodiment, the information received from the mobile terminal of the identified user and the mobile terminal of the at least one different user may be schedule information stored in each of the mobile terminals.

In an embodiment, the electronic device may further include: a camera configured to receive an image of a user's face to identify the user through face recognition, wherein when information reserved by a second user, different from a first user, to be output to the first user exists, the controller may control the output unit to output the reserved information in response to the reception of the image of the first user's face through the camera.

In an embodiment, the output unit may include a display unit configured to output visual information, and when an approach of a user, different from the identified user, is sensed while the information related to the identified user is being output to the display unit, the controller may control the display unit to output information related to the different user.

In an embodiment, when the different user's approach is sensed, the controller may divide the display unit into a plurality of regions and continuously output the information related to the identified user to the first region among the plurality of regions and output the information related to the different user to a second region different from the first region among the plurality of regions.

In an embodiment, the controller may control the information related to the different user to be output in a different manner according to an attribute of the information output to the display unit before the different user's approach is sensed, and when the information output to the display unit before the different user's approach is sensed corresponds to a first attribute, the controller may divide the display unit into a plurality of regions and output the information related to the different user to the second region, and when the information output to the display unit before the different user's approach is sensed corresponds to a second attribute different from the first attribute, the controller may restrain the display unit from being divided into a plurality of regions and output a graphic image indicating that the different user has been identified.

In an embodiment, the display unit may include a main region and a sub-region surrounding the main region, and the information related to the identified user is output to the main region and the graphic image indicating that the different user has been identified is output to the sub-region.

In an embodiment, the electronic device may further include: a memory configured to store priority information, wherein when a plurality of users have been identified, the controller may output information related to a user having high priority among the plurality of users on the basis of the priority information stored in the memory.

In an embodiment, the electronic device may further include: a wireless communication unit configured to communicate with at least one different electronic device, wherein when information indicating that the user has been identified is received from any one of the at least one different electronic device, the controller may transmit the information, which has been output through the output unit, to the at least one different electronic device so that the information can be output from the at least one different electronic device.

In an embodiment, the electronic device may further include: a microphone configured to receive a voice, wherein the output unit may include a display unit configured to recognize a touch applied thereto, wherein when a distance between the user and the body is equal to or longer than the reference distance, the controller may execute a voice recognition function to receive a user's voice control command through the microphone, and when a distance between the user and the body is shorter than the reference distance, the controller may output at least one visual key to the display unit to receive a control command through the user's touch with respect to the display unit.

In an embodiment, although the user moves from a position within the distance between the user and the body which is equal to or longer than the reference distance to a position within the distance between the user and the body which is shorter than the reference distance, the controller may perform a function according to the user's voice control command input through the microphone.

In an embodiment, the sensing unit may include a wireless communication unit that can recognize an electronic device different from the electronic device, and sense the user's approach as the different electronic device is recognized through the wireless communication unit.

According to another aspect of the present invention, there is provided a method for controlling an electronic device including an electronic device body and an output unit disposed in the body and configured to output information, including: sensing a user's approach to the body; identifying the user whose approach has been sensed; and outputting information related to the identified user in a different manner according to a distance between the body and the user.

In an embodiment, the output unit may include a display unit and a speaker, and when a distance between the user and the body is equal to or longer than a reference distance, the information related to the user may be output through the speaker, and when a distance between the user and the body is shorter than the reference distance, the information related to the user may be output through at least one of the speaker and the display unit.

In an embodiment, the information related to the identified user is information received from a mobile terminal of the identified user.

In the case of the electronic device and the control method thereof according to embodiments of the present invention, when a user access is sensed, the accessing user is identified and information related to the identified user can be provided. Thus, the user may be provided with customized information appropriate for him or her.

Also, in the case of the electronic device and the control method thereof according to embodiments of the present invention, when a plurality of users are identified, information related to each of the plurality of users or information that may be used by the plurality of users can be output, whereby needs of the plurality of users can be satisfied through a single electronic device.

In addition, in the case of the electronic device and the control method thereof according to embodiments of the present invention, it can communicate with at least one electronic device and exchange control signals therewith, thus establishing a home network environment.

BRIEF DESCRIPTION OF DRAWINGS

FIG. 1 is a block diagram illustrating an electronic device according to an embodiment of the present invention.

FIGS. 2 and 3 are conceptual views illustrating the electronic device according to an embodiment of the present invention.

FIG. 4 is a flow chart illustrating an operation of the electronic device according to an embodiment of the present invention.

FIGS. 5, 6A, 6B, 6C, 7A, 7B, 7C, 8, 9A, and 9B are conceptual views illustrating operations of the electronic device of FIG. 3;

FIGS. 10A, 10B, 10C, 10D, 10E, and 10F are conceptual views illustrating a method for displaying information when a plurality of users are identified in the electronic device according to an embodiment of the present invention.

FIGS. 11A and 11B are conceptual view illustrating a case in which a plurality of electronic devices exist.

FIGS. 12A to 12C are conceptual views illustrating an example in which electronic devices communicate with each other according to an embodiment of the present invention.

FIGS. 13A through 13C are conceptual views illustrating a method for establishing a home network by utilizing the electronic device according to an embodiment of the present invention.

DETAILED DESCRIPTION OF EMBODIMENTS OF THE INVENTION

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Electronic devices described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultrabooks, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

FIG. 1 is a block diagram of a electronic device according to an embodiment of the present invention.

The electronic device 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the electronic device as having various components, but it should be understood that implementing all of the illustrated components is not a requirement. Greater or fewer components may alternatively be implemented.

The elements of the electronic device will be described in detail as follows.

The wireless communication unit 110 typically includes one or more modules allowing radio communication between the electronic device 100 and a wireless communication system or a network in which the electronic device is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a electronic device. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the electronic device. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the electronic device. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the electronic device.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the electronic device. The user input unit 130 may include a keypad, a dome switch, a touch pad, a jog wheel, a jog switch, and the like.

The sensing unit 140 detects a current status (or state) of the electronic device 100 such as an opened or closed state of the electronic device 100, a location of the electronic device 100, the presence or absence of user contact with the electronic device 100 (i.e., touch inputs), the orientation of the electronic device 100, an acceleration or deceleration movement and direction of the electronic device 100, etc., and generates commands or signals for controlling the operation of the electronic device 100. For example, when the electronic device 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the electronic device 100. For example, when the electronic device 100 is in a phone call mode, the display unit 151 may display a User Interface (UI) or a Graphic User Interface (GUI) associated with a call or other communication (such as text messaging, multimedia file downloading, etc.). When the electronic device 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The electronic device 100 may include two or more display units according to its particular desired embodiment. For example, a plurality of display units may be separately or integrally disposed on one surface of the electronic device, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the electronic device 100 (e.g., an excess of energy use, event information output mode, or the like). The audio output module 152 may include a speaker, a buzzer, or other sound generating device.

The alarm unit 153 may provide outputs to inform about the occurrence of an event of the electronic device 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may be operated in relation to a web storage device that performs the storage function of the memory 160 over the Internet.

The interface unit 170 serves as an interface with every external device connected with the electronic device 100. For example, the external devices may transmit data to an external device, receives and transmits power to each element of the electronic device 100, or transmits internal data of the electronic device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the electronic device 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the electronic device 100 is connected with an external cradle, the interface unit 170 may serve as a passage to allow power from the cradle to be supplied therethrough to the electronic device 100 or may serve as a passage to allow various command signals inputted by the user from the cradle to be transferred to the electronic device therethrough. Various command signals or power inputted from the cradle may operate as signals for recognizing that the electronic device is properly mounted on the cradle.

The controller 180 typically controls the general operations of the electronic device. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a configuration of the electronic device according to an embodiment of the present invention as described above with reference to FIG. 1 will be described in detail. FIGS. 2 and 3 are conceptual views illustrating the electronic device according to an embodiment of the present invention.

The electronic device according to an embodiment of the present invention may be disposed in various places such as homes, offices, stores, and the like. The electronic device may be utilized for various purposes according to places in which it is disposed. For example, when the electronic device is disposed in home, the electronic device may help the living of family members. For example, the electronic device may manage schedules of family members or provide useful information required for living, such as time, weather, or traffic information. Also, when the v is disposed in an office, the electronic device may increase work efficiency. For example, the electronic device disposed in an office may provide a work schedule of a user. In this manner, the electronic device may be disposed in various places so as to be utilized, and may be placed in various positions according to user preference.

Also, the electronic device may have various shapes. In a typical example, the electronic device may have a circular shape as illustrated in FIG. 2 or may have a square shape as illustrated in FIG. 3. Also, the display unit 151 may have a shape the same as or similar to an external shape of the electronic device 100. Also, if a shape of the display unit 151 is not the same or similar to the external shape of the electronic device 100, a portion thereof exposed to the outside may be shown to be the same or similar to the external shape of the electronic device 100.

Also, as illustrated in FIGS. 2 and 3, the electronic device 100 may include a support (or cradle) 200, and may be placed in a position desired by the user through the support. Also, although not shown, the electronic device 100 may be a wall mounted-type device, and may be disposed on a surface of a wall, like a frame. A bezel region 1010 is also shown.

Also, the electronic device 100 according to an embodiment of the present invention may have various other shapes, without being limited to the foregoing shapes.

Hereinafter, a method for outputting information useful to the user by the electronic device will be described in detail with reference to FIGS. 1 and 2 together with other accompanying drawings.

FIG. 4 is a flow chart illustrating an operation of the electronic device according to an embodiment of the present invention, and FIGS. 5, 6A, 6B, 6C, 7A, 7B, 7C, 8, 9A, and 9B are conceptual views illustrating operations of the electronic device of FIG. 3.

When the user approaches the body of the electronic device according to an embodiment of the present invention, the electronic device may output user-related information or specified information. Also, although the user is not near the electronic device, the electronic device may output at least one of various pieces of visual and aural information. Also, while the electronic device is being output various types of information, when the user approaches the electronic device, the electronic device may terminate outputting the current information and output information related to the approached user. Hereinafter, a method for outputting information related to the approached user when the user approaches the electronic device.

First, the electronic device according to an embodiment of the present invention senses user's approach to the body of the electronic device (S310).

Here, the user's approach to the body may be sensed by at least one of the sensing unit 140, the A/V input unit 120, and the wireless communication unit 110.

For example, the sensing unit 140 (please see FIG. 1) may include the proximity sensor 141. The proximity sensor 141 may sense whether the user has approached the body of the electronic device.

Also, the controller 180 may determine whether the user has approached the body through the A/V unit 120. For example, when the user is included in an image input through the camera 121, the controller 180 may determine that the user has approached the body. Also, the controller 180 may additionally determine whether the user how close the user is to the body through a degree of a region occupied by the image corresponding to the user in the image, and may determine whether the user may be substantially close to the body enough to use information output from the body.

In order to sense user's approach through the camera 121, the camera 121 may be in a constantly activated state or may be activated at pre-set time intervals.

Also, when the user's voice is sensed by the microphone 122, the controller 180 may determine that the user has approached the body. In this case, the microphone 122 may be in an activated state in which it can constantly sense the user's voice or may be activated at pre-set time intervals.

Also, the controller may determine whether the user has approached according to whether the wireless communication unit 110 senses an external device that may be able to communicate with the wireless communication unit 110. For example, the wireless communication unit 110 may communicate with an external device by using at least one of wireless-fidelity (Wi-Fi), digital living network alliance (DLNA), near field communication (NFC), infrared data association (IrDA), ultra-wide band (UWB), ZigBee, Bluetooth (BT), and a Wi-Fi direct communication scheme. When an external device available for communication is sensed through the wireless communication unit 110 by using at least one of the various communication schemes, the controller 180 may determine that the user has approached. Namely, by sensing an external device through the wireless communication unit 110, the controller 180 may sense whether the user who carries the external device (e.g., a smart phone) has approached the body.

Also, the wireless communication unit 110 or the controller 180 may measure relative signal strength between the external device and the wireless communication unit 110, and the controller 180 may determine whether the user has approached the body substantially enough to use information output from the body according to a degree of the signal strength.

When the user's approach to the body is sensed, the electronic device according to an embodiment of the present invention identifies the user whose approach has been sensed (S320). Namely, the controller 180 may determine 'who' is the approached user with respect to the body. The memory 160 may store information regarding a plurality of users, e.g., identification information regarding each of the family members, and the controller 180 may identify the user who has approached the body.

Such user identification may be performed through various methods such as a face recognition function using the camera 121, a voice recognition function using the microphone 122, a fingerprint recognition function, and the like. For example, the memory 160 may have at least one of the user's face information, voice information, and fingerprint information, and the controller 180 may determine who has been approached the body, by utilizing the foregoing information stored in the memory 160.

Also, user identification may be performed through identification information regarding the external device sensed through the wireless communication unit 110. For example, a particular user may use his or her particular external device (e.g., a smart phone, a watch phone, a glass phone, or the like), and such a particular external device may have unique identification information. Thus, the memory 160 may have user information (e.g., a name of the particular user, or the like) regarding the particular user, identification information (unique No. of the terminal) regarding the particular external device of the particular user, access point (AP) information, Bluetooth information, near field communication (NFC) stored therein, and the controller 180 may identify the particular user by comparing the information stored in the memory 160 with the information sensed through the wireless communication unit 110 (or by referring to the information stored in the memory 160.

For example, when the external device having an NFC function is tagged to an electronic device having an NFC function or to a peripheral device connected to the electronic device, the controller 180 may identify the tagged external device and a user of the external device.

Also, in the electronic device according to an embodiment of the present invention, components utilized for sensing a user's approach and components utilized for identifying the user may be different. For example, when the controller 180 senses a user's approach through the proximity sensor, the controller may activate the camera to receive an image of the user's face and identify the user by utilizing a face recognition function.

Meanwhile, when the user is identified, information related to the identified user is output in the electronic device according to an embodiment of the present invention, and in this operation of outputting information related to the user, information may be output in different manners according to a distance between the user and the body of the electronic device (S330).

For example, when a distance between the user and the body 100 as illustrated in (a) of FIG. 5 is a reference difference 'a' and a distance between the user and the body 100 as illustrated in (b) of FIG. 5 is a reference distance 'b' shorter than the reference distance 'a', the controller 180 may control schemes of outputting information differently.

For example, when the user is present in the reference distance 'a', the controller 180 may output information related to the user by utilizing an aural scheme, and when the user is present in the reference distance 'b', the controller 180 may output information related to the user by utilizing at least one of visual and aural schemes.

Namely, when the distance between the user and the body 100 is equal to or greater than the reference distance, the controller 180 may output information related to the user by using the speaker, and when the distance between the user and the body 100 is smaller than the reference distance, the controller 180 may output information related to the user by using at least one of the speaker and the display.

Also, when the user is in the reference distance 'a', the controller 180 may output aural information with a loudness level of 3, and when the user is in the reference distance 'b', the controller 180 may output aural information with a loudness level of 1.

Also, when the user is in the reference distance 'a', the controller 180 may output text (or characters) having a size greater than that of the case in which the user is in the reference distance 'b'. Namely, the information output to the display unit may vary according to a distance between the user and the body 100.

Also, when the distance between the user and the body 100 is changed as the user approaches the body 100, the controller 180 may output information in an appropriate manner according to the changed distance. For example, when the distance between the user and the body 100 is changed from the reference distance 'a' to the reference distance 'b', the controller 180 may terminate outputting of the aural information and output visual information. Namely, when the user moves from a position within the distance between the user and the body 100 which is equal to or longer than the reference distance to a position within the distance between the user and the body 100 which is shorter than the reference distance, the information, which has been output through the speaker, may be output through the display unit or may be output through both the speaker and the display unit.

As described above, the distance between the body 100 of the electronic device and the user may be measured in various manners. For example, the distance between the body 100 of the electronic device and the user may be measured by using at least one the camera 121, the microphone 122, and the proximity sensor (not shown).

Meanwhile, the information related to the user output as the user is identified may be information which has been stored in the memory 160 of the electronic device, may be information received from a mobile terminal (e.g., a smartphone) of the user, or may be information received from a cloud server.

For example, the controller 180 may store information related to the user in the memory 160 in advance, and when the user is identified, the controller 180 may output the stored information related to the user. For example, the information related to the user may be information which has been stored by the identified user or may be information stored by a different user.

For example, when the identified user is a 'first user', a 'second user', not the 'first user', may have information that the second user wants to provide to the first user. Then, the second user may store information desired to be provided to the first user in the memory 160, and when the first user approaches the body 100 of the electronic device, the second user may apply a control command (which may be generated through a voice command or a touch manipulation, for example) for outputting the information to the electronic device. Then, in response to the control command, the controller 180 may control the electronic device to output the information received from the second user to the first user, and when the first user is identified, the controller 180 may output the information which has been received from the second user to the first user. For example, when a user is identified through face recognition and information which has been reserved by the second user, different from the first user, to be output to the first user exists, the controller 180 may control the output unit 150 to output the reserved information in response to the reception of the image of the first user's face.

In another example, when the user is identified, the controller 180 may receive information related to the user from a mobile terminal of the identified user. Here, the information related to the user may include at least one of event information generated in the mobile terminal, event information not checked yet by the user among event information generated in the mobile terminal, information corresponding to pre-set importance, information related to a pre-set application installed in the mobile terminal, and information selected by the user to be output from the electronic device. Namely, types of information transmitted from the mobile terminal to the electronic device may vary.

Also, although the mobile terminal is not located near the body 100 of the electronic device, the controller 180 may receive information from the mobile terminal and output the same through the output unit 150. Thus, although the electronic device is located in a first space and the mobile terminal of the user is located in a second space spaced apart from the first space, the information related to the mobile terminal may be received through the electronic device in the first space, and thus, although the user does not carry around the mobile terminal, the user may use the information related to the mobile terminal (i.e., his mobile terminal) through the electronic device.

Also, the controller 180 may output information received from a mobile terminal of at least one different user, not the foregoing user, together according to a type of output information. For example, the controller 180 may receive schedule information regarding family members to be shared by the family members, from a mobile terminal of each user corresponding to the family members, and output the same together with the schedule information of the identified user.

Hereinafter, the foregoing content will be described in more detail with reference to the accompanying drawing to help understood the foregoing description.

First, as illustrated in FIGS. 6A and 6B, until before a user approaches the electronic device according to an embodiment of the present invention or until before a user is identified, the electronic device may output general information. Here, the information output to the electronic device before the user approaches the body of the electronic device may be information regarding a state of the electronic device, information regarding an external environment, time information, and the like. For example, time information may be output as illustrated in FIG. 6A, or weather information may be output as illustrated in FIG. 6B. Also, although not shown, in a case in which the electronic device is connected to at least one different electronic device (e.g., in a case in which the electronic device and the at least one different electronic device are in a state in which they can communicate to exchange information), state information of the different electronic device may be output to the electronic device. For example, when the electronic device and the different electronic device are devices disposed in home, the different electronic device may be a home appliance. Thus, the user may recognize a state of an air-conditioner, a refrigerator, or the like, through the electronic device.

Also, as illustrated in FIG. 6C, the controller may display additional information even in a bezel region 101, whereby family members present in the house and family members present outside may be displayed. For example, graphic objects 1111 displayed within the region of the display unit 151 may indicate family members present in the house, and a graphic object 1112 displayed in the bezel region 101 may indicate a family member present outside. Also, although not shown, the controller 180 may output information regarding the users corresponding to the respective graphic objects to the graphic objects.

Meanwhile, although the user approaches the electronic device, the controller 180 may continuously output the information regarding the family members present in the house or outside. Also, in a case in which information regarding a time at which a family member present outside is due to come home exists, the controller 180 may output the graphic object 1112 corresponding to the family member in a display position corresponding to a time at which the family member is to come home, on the basis of the time information. As illustrated, the family member corresponding to the graphic object 1112 may be a family member due to come home at 9:00 a.m. or 9:00 p.m.

Also, when user's approach to the body is not sensed, the controller 180 may limit outputting of information in order to reduce power consumption.

Meanwhile, when the user approaches the body 100 of the user is identified, the controller 180 outputs information related to the identified user. In this case, as described above, the controller 180 may output the information related to the user in different manners according to a distance between the user and the body 100. For example, as described above with reference to (a) of FIG. 5, when the distance between the user and the body 100 is not within the reference distance (for example, when the distance between the user and the body 100 is the length 'a', the controller 180 may output information as large as for the user to sufficiently check the visual information from a distance. As illustrated in FIG. 7A, when the information related to the identified user is information related to a message and the distance between the user and the body 100 is greater than the reference distance, the controller 180 may output only the icon or the graphic object indicating the presence of a message to be read (or checked) such that it is large. Also, for the user who is not within the reference distance, the controller 180 may output information regarding the message through a sound. Thus, the user may be provided with the information regarding the message from the electronic device through a sound. Also, alternatively, as illustrated in FIGS. 7B and 7C, in a case in which the distance between the user and the body 100 is within the reference distance (e.g., in a case in which the distance between the user and the body 100 is the length 'b' (please see (b) of FIG. 5)), the controller 180 may directly output message content 910, instead of displaying the icon indicating reception of the message. In this manner, as illustrated in FIGS. 7B and 7C, when the distance between the user and the body 100 is within the reference distance, the controller 180 may display information regarding the identified user in detail. For example, as illustrated in FIG. 7C, when the user approaches the body 100, detailed schedule information 920 may be checked.

Also, in a case in which the distance between the user and the body 100 is greater than the reference distance, the controller 180 may execute at least one of a voice recognition function and a voice output function as illustrated in (a) and (b) of FIG. 8, to allow the user to quickly and easily perform controlling on the electronic device. Here, the voice output function may be utilized to output information related to the user. Also, the controller 180 may control the audio output unit 152 to vary loudness of an output voice according to a distance between the user and the body of the electronic device 100.

Also, the controller 180 may generate a control signal for controlling the electronic device by using the user's voice input though the microphone 122. The electronic device may be controlled on the basis of the control signal. Also, the control signal may be transmitted to at least one different electronic device connected to the electronic device through the wireless communication unit 110, whereby the at least one different electronic device may be controlled on the basis of the user's voice as a result.

Meanwhile, after the users' approach to the body is sensed and the user is present not within the reference distance, a wake-up mode in which inputting of the user's voice to the microphone 122 is awaited may be activated. For example, when the microphone 122 is activated all the time, the controller 180 may recognize a voice as a voice for controlling the electronic device although it is not. Thus, the microphone 122 may be controlled to be activated (or the wake-up mode is activated) only when it is previously set. The pre-set case may be when a user's approach is sensed or when a user's approach is sensed and a distance between the user and the body 100 is greater than the reference distance as described above. Meanwhile, after the wake-up mode of the microphone 122 is activated, if a voice is not input to the microphone 122 during a pre-set period of time, the wake-up mode of the microphone 122 may be deactivated. Namely, in the case in which the wake-up mode of the microphone 122 is deactivated, although the user inputs a voice to the electronic device, the controller 180 may not recognize the voice as a control command for controlling the electronic device. In this case, the user may deactivate the wake-up mode of the microphone 122 again by manipulating the electronic device 100.

Meanwhile, in the case in which a voice is input through the microphone 122, the controller 180 may analyze the input voice and generate a control command corresponding to the analyzed voice.

For example, the controller 180 may convert an input voice into text by using a text-to-speech (TTS) technology. And then, the controller 180 may compare the converted text with a control command previously stored in the memory 160 to select a control command corresponding to the converted text.

In another example, the controller 180 may understand a language corresponding to the input voice by using a natural language processing technology to generate a corresponding control command. Namely, the controller 180 may analyze the meaning of the input voice, generate a corresponding control command, and perform corresponding controlling.

Meanwhile, the control command as described above may be transmitted in the form of a control signal to at least one different electronic device through wireless communication.

Meanwhile, it is obvious that the voice recognition function as described above may be executed even when a distance between the user and the body is within the reference distance. Meanwhile, while the user is not within the reference distance with respect to the body and is receiving a control command through a voice, when the user moves to be within the reference distance with respect to the body, at least one visual key may be output to the display unit to receive a control command through the user's touch. Also, although the user moves to be within the reference distance from a position not within the reference distance, the controller 180 may continuously perform the function according to the user's voice control command input through the microphone. Namely, after the voice recognition function is activated, if the user moves to be within the reference distance with respect to the body, the controller 180 may continuously maintain the activated state of the voice recognition function.

Meanwhile, in a case in which the user approaches the electronic device according to an embodiment of the present invention and information regarding the approached user does not exist (namely, when the user is not identified) or in a case in which information to be output in relation to the identified user does not exist, the electronic device may output appropriate information according to circumstances.

For example, when a current time falls within the rush hour as illustrated in FIG. 9A, the controller 180 may output information 810 related to means of transportation that the identified user frequently uses.

In another example, as illustrated in FIG. 9B, the controller 180 may output function icons 820 for accessing at least one function. Thus, the user may select any one (e.g., an event icon) from among the function icons to be provided with information corresponding to the selected icon.

As described above, in the electronic device and the control method thereof according to an embodiment of the present invention, when a user's approach is sensed, the approached user is identified and information related to the identified user may be provided. Thus, the user may be provided with customized information appropriate for her or him. In addition, in the electronic device and the control method thereof according to an embodiment of the present invention, information is output in different manners according to a position of the approached user, whereby the user may be provided with the information appropriately even in a current location.

Hereinafter, a method for outputting information related to an additionally identified user in a case in which at least one user is additionally identified while information regarding an identified user is being output as the user is identified will be described in detail with reference to the accompanying drawings. FIGS. 10A, 10B, 10C, 10D, 10E, and 10F are conceptual views illustrating a method for displaying information when a plurality of users are identified in the electronic device according to an embodiment of the present invention.

As in the embodiment described above, when a user's approach is sensed and the user identified, information related to the identified user is output. In this case, while the information related to the identified user is being output, if an approach of a different user, other than the identified user, is sensed and the different user is identified, the controller 180 may control the display unit to output information related to the different user.

Here, a type of the information related to the different user may be a type the same as or different from that of the information which was output to the display unit 151 before the different user's approach was sensed and the different user was identified. For example, although the information which was output to the display unit 151 before the different user's approach was sensed and the different user was identified is information related to a message, the information to be output in relation to the different user may be information related to a photograph. Meanwhile, in the memory 160, priority information regarding users may have been stored. In this case, regardless of order of a plurality of identified users, the controller 180 may output only information related to any one user among the plurality of users on the basis of the priority information stored in the memory. For example, when a second user is identified while information related to a first user is being output, if the second user has priority higher than that of the first user, the information related to the first user may be continuously output in the electronic device.

Here, a method for outputting the information related to the different user will be described in detail. For example, as illustrated in FIG. 10A, the display unit may include a main region 151a and a sub-region 151b surrounding the main region 151a. Information 1040a related to the identified user is output to the main region 151a, and a graphic image indicating that the different user has been identified or information 1040b related to the different user may be output to the sub-region 151b. here, the sub-region 151b may be called a 'bezel region', and the bezel region may be recognized as having a color different from that of the main region 151a to the user's naked eyes.

Meanwhile, when the information output to the bezel region is selected by the user, the information output to the bezel region or information related to the information output to the bezel region may be output to the main region 151a. In this case, the information which has been output to the main region 151a may not be displayed any longer or the information related to the information output to the main region 151a may be output to the sub-region 151b.

Meanwhile, regardless of order of identified users, the controller 180 may output information related to a user having high priority among the plurality of users to the main region 151a and information related to a user having low priority to the sub-region 151b on the basis of the priority information stored in the memory. Meanwhile, the main region 151a and the sub-region 151b may be divided as having various sizes and shapes in the display region.

In another example, to cope with a situation in which a plurality of users are identified, the display unit 151 of the electronic device according to an embodiment of the present invention may be divided into a plurality of regions to output information corresponding to each of the plurality of identified users.

As illustrated in FIGS. 10B and 10C, the controller 180 may divided the display unit 151 into a plurality of regions 1050a and 1050b and continuously output the information related to the first user identified before the different user is identified to the first region 1050a and output information related to the different user to the second region 1050b different from the first region 1050a among the plurality of regions. Meanwhile, sizes of the plurality of regions may be different and shapes thereof may be variously modified.

Meanwhile, the controller may control a scheme of outputting the information related to the different user differently according to an attribute of the information output to the display unit before the different user's approach is sensed. For example, in a case in which the information output to the display unit before the different user's approach is sensed corresponds to a first attribute, the controller 180 may divide the display unit into a plurality of regions and output the information related to the different user to the second region 1050b (please see FIGS. 10A and 10B)

And then, as illustrated in FIG. 10D, in a case in which information output to the display unit 151 before the different user's approach is sensed corresponds to a second attribute different from the first attribute (please see (a) of FIG. 10D), the controller 180 may restrict the display unit from being divided into a plurality of regions as illustrated in FIGS. 10B and 10C and may output a graphic image 1060 indicating that the different user has been identified or information (or simple information, please refer to 1061) related to the different user as illustrated in (b) of FIG. 10D.

Also, as well as outputting the information regarding the different user together with the information of the first identified user, the controller 180 may change output information itself into information that may be commonly utilized by the different user and the first identified user.

For example, in an embodiment in which a photograph is output, the display unit 151 is in an OFF state before the user's approach to the body is sensed as illustrated in (a) of FIG. 10E, and when the first user is identified, the controller 180 may output a photograph 1010 of the first user as illustrated in (b) of FIG. 10E.

When the second user is additionally identified together with the first user, the controller 180 may output a photograph 1020 of the first and second users taken together as illustrated in (c) of FIG. 10E. When a third user is further identified in addition to the second user, the controller 180 may output a photograph 1030 of the first, second, and third users taken together as illustrated in (d) of FIG. 10E.

Meanwhile, in the above, the method for switching the information, which has been output to the display unit 151, to different information when an additional user is identified has been described, but the present inventive concept is not limited thereto and the controller 180 may change only a display size of the information, which has been first output, and output the same together with additional information, or may overlap the additional information with at least a portion of the information which has been output, thus continuously displaying the first output information.

Also, the electronic device according to an embodiment of the present invention may additionally output information related to respective users to mobile terminal 100b and 100c individually carried around by the users as illustrated in (a), (b), and (c) of FIG. 10F.

Namely, as illustrated in (a) of FIG. 10F, the controller 180 may output the information 1070 common to all of the first and second users to the display unit 151, and additionally output information related to each of the users to (b) and (c) of FIG. 10F. Here, the mobile terminals 100b and 100c individually carried around by the users may be glass type mobile terminals, watch type mobile terminals, or bar type mobile terminals as illustrated.

As described above, although a plurality of users are identified, the electronic device according to an embodiment of the present invention may output information that may be commonly used by a plurality of users together or output information required for each of the plurality of users, thereby increasing user convenience.

Hereinafter, a method for establishing a home network by utilizing the electronic device according to an embodiment of the present invention will be described in detail with reference to the accompanying drawings. FIGS. 11A and 11B are conceptual view illustrating a case in which a plurality of electronic devices exist, FIGS. 12A to 12C are conceptual views illustrating an example in which electronic devices communicate with each other according to an embodiment of the present invention, and FIGS. 13A through 13C are conceptual views illustrating a method for establishing a home network by utilizing the electronic device according to an embodiment of the present invention.

As illustrated in FIGS. 11A and 11B, the electronic devices according to an embodiment of the present invention may be disposed in different places (e.g., in different houses or in different rooms in the same house), respectively, to perform communication with each other.

Here, the electronic devices may communicate through at least one of wireless-fidelity (Wi-Fi), digital living network alliance (DLNA), near field communication (NFC), infrared data association (IrDA), ultra-wide band (UWB), ZigBee, Bluetooth (BT), and a Wi-Fi direct communication scheme by using a wireless communication unit included therein.

In this manner, since the plurality of electronic devices communicate with each other, they can exchange data with each other. Thus, users may be provided with the same information or relevant information by using the different electronic devices even in different places.

For example, as illustrated in FIG. 12A, while the user is viewing movie by using a first electronic device 100a in a first space, the user may move to a second space. In this case, the user's approach to the second electronic device 100b may be sensed and the user may be identified. Then, as illustrated in (b) of FIG. 12A, a controller of the second electronic device 100b may continuously output the information (e.g., the movie), which has been output to the first electronic device 100a, through the second electronic device 100b.

In this case, since the user is not sensed any longer in the first electronic device 100a, the first electronic device 100a may transmit data corresponding to the movie to the second electronic device 100b. Also, alternatively, when the user's approach to the second electronic device 100b is sensed and the user is identified in the second electronic device, the second electronic device may request transmission of the information which has been output to the first electronic device 100a, from the first electronic device 100a which has output the information with respect to the user.

Also, as described above, the electronic device according to an embodiment of the present invention may communicate with the mobile terminal 100c of the user, and as illustrated in FIG. 12B, when an event (e.g., a call event) occurs in the mobile terminal 100c of the user, the controller 180 may receive the event information from the mobile terminal 100c and output the same to the electronic device 100a. Thus, although the user does not carry around the mobile terminal, he or she may check an event through the electronic device any time.

Also, according to an embodiment of the present invention, the mobile terminal 100c may transmit event information to the electronic device 100b present in the closest location on the basis of the mobile terminal 100c, and the electronic device 100a present in a location of the user may receive the event information of the mobile terminal 100c from the electronic device 100b.

Also, as illustrated in FIG. 12C, the electronic devices 100a, 100b, and 100c disposed in different places a, b, and c may share functions performed separately or history information regarding the functions. For example, in a case in which a music play function is executed in the electronic device 100a located in the place 'a' and a movie play function is executed in the electronic device 100b located in the place 'b', the electronic device 100c located in the place 'c' may output information regarding the functions performed in the electronic devices 100a and 100b according to a user request (In this case, the information regarding the functions performed in the electronic devices 100a and 100b may be output in a list form).

As described above, the electronic devices according to an embodiment of the present invention may perform data communication with each other wirelessly or through a fixed line, and may share information. Thus, no matter which of the electronic devices is used, the user may use again information which was used previously or information which was used in a particular electronic device.

Also, the electronic device described in the present disclosure may be connected to at least one different external device through wired or wireless communication to output information related to the at least one different external device or control the at least one different external device.

The electronic device may be utilized in a home network, for example. A home network refers to connecting at least one electronic device or home appliance used in a household through a fixed line or wirelessly. In an environment in which a home network or a network is established, the electronic device according to the present disclosure may receive information from at least one electronic device which communicates through wired or wireless communication and effectively provide the same to the user or may control at least one external device (or home appliance) according to a control command received from the user.

As illustrated in FIG. 13A, the electronic device may communicate with at least one external device 1410, 1420, or 1430 by using at least one of wireless-fidelity (Wi-Fi), digital living network alliance (DLNA), near field communication (NFC), infrared data association (IrDA), ultra-wide band (UWB), ZigBee, Bluetooth (BT), and a Wi-Fi direct communication scheme. When an external device available for communication is sensed through the wireless communication unit 110 by using at least one of the various communication schemes, the controller 180 may determine that the user has approached. Namely, by sensing an external device through the wireless communication unit 110, the controller 180 may sense whether the user who carries the external device (e.g., a smart phone) has approached the body.

Here, a communication scheme of the at least one external device 1410, 1420, or 1430 with the electronic device 100a may be set by a user selection or may be set through automatic recognition between devices.

As illustrated in FIG. 13A, the electronic device 100a according to an embodiment of the present invention may be connected to the refrigerator 1410, the washing machine 1420, the illumination 1430, or the like.

In this manner, the electronic device 100a may be connected to at least one external device and perform a central control device function of collectively controlling the external devices. Also, the electronic device 100a may serve as a main server of the home network. Also, the home network utilizing the electronic device may have a server 1440 as illustrated in FIG. 13B.

Here, any external device may be used as long as it can communicate with the electronic device according to an embodiment of the present invention through the communication scheme as described above. Also, when an event occurs, the external device may transmit event information corresponding to the generated event to the electronic device.

Meanwhile, the event generated in the external device may be received through a wireless communication unit, and such an event may occur when a task (or an operation) performed in the external device is terminated or stopped or when a task to be performed in the electronic device exists.

For example, in a case in which the electronic device is a 'washing machine', an event may occur when washing is completed in the washing machine, when the laundry is not taken out during a pre-set period of time after washing is completed in the washing machine, when the washing machine has an error, or the like.

In another example, in a case in which the electronic device is an 'air-conditioner', an event may occur when the air-conditioner has an error, when it is a time during which energy consumption is the greatest, when an indoor temperature is an appropriate temperature, when indoor air has a temperature at which a discomfort index is high, and the like.

In another example, in a case in which the electronic device is a 'refrigerator', an event may occur when power of the refrigerator is turned off, when a refrigerator door is opened, when the refrigerator may be changed to a power saving mode, and the like.

In another example, when the electronic device is a 'TV', an event may occur when a reserved program starts, when the TV can be changed into a power saving mode, and the like.

In another example, as illustrated in FIG. 13C, when the electronic device is an 'oven (or a convection oven), an event may occur when cooking is terminated (please see (a) in FIG. 13C), when the device has an error, when the device can be changed to a power saving mode, and the like.

As described above, the electronic device 100 according to an embodiment of the present invention may receive event information regarding an event generated in the external device.

The electronic device 100 may output a state of the electronic device to the user on the basis of the received event information (please see (b) of FIG. 13C). The event information may be output only when the user is located near the electronic device or may be output through the scheme described together with the control method of FIG. 3.

Also, as illustrated in (c) of FIG. 13C, the electronic device according to an embodiment of the present invention may generate a control signal for controlling an external device according to a user selection or request with respect to the electronic device. For example, as illustrated, the electronic device may transmit a control signal for additionally operating an oven 1450 for 15 minutes to the oven 1450. Thus, the user may immediately check the event generated in the external device through the electronic device, and controls the external device through the electronic device, thus immediately coping with the event generated in the external device.

Also, in the electronic device according to an embodiment of the present invention, when event information is received from an external device, the electronic device may transmit the received event information to the user's mobile terminal 100b (e.g., a mobile phone, a smartphone, a table PC, or the like) (please see FIGS. 13A and 13B) by using a wireless communication unit. When the mobile terminal 100b receives the control signal for controlling the external device, the electronic device according to an embodiment of the present invention may transmit the control signal to the external device by using a wireless communication unit. Thus, although the user cannot directly check the electronic device, the user may check a state of the external device and control the external device through the mobile terminal.

Also, in the case of the electronic device and the control method thereof according to an embodiment of the present invention, when a user's approach is sensed, the approached user is identified and information related to the identified user may be provided. Thus, the user may be provided with customized information appropriate for him or her.

Also, in the case of the electronic device and the control method thereof according to an embodiment of the present invention, when a plurality of users are identified, information related to each of the plurality of users or information that may be commonly used by the plurality of users is output, whereby needs of the plurality of users may be satisfied through the single electronic device.

Also, in the case of the electronic device and the control method thereof according to an embodiment of the present invention, since the electronic device communicates with at least one electronic device and exchange control signals, thus establishing a home network environment.

In the embodiments of the present invention, the foregoing method may be implemented as codes that can be read by a processor in a program-recorded medium. The processor-readable medium may include any types of recording devices in which data that can be read by a computer system is stored. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The electronic device according to the embodiments of the present disclosure is not limited in its application of the configurations and methods, but the entirety or a portion of the embodiments can be selectively combined to be configured into various modifications.

The invention claimed is:

1. An electronic device comprising:
an electronic device body;
an output unit disposed in the body and configured to output information;
a sensor configured to sense a user's approach to the body; and
a controller configured to:
identify the user whose approach has been sensed, and
output information related to the identified user in a different manner according to a distance between the body and the user.

2. The electronic device of claim 1, wherein the output unit comprises a display unit and a speaker, and
when the distance between the user and the body is equal to or longer than a reference distance, the controller outputs the related information by using the speaker, and
when the distance between the user and the body is shorter than the reference distance, the controller outputs the related information by using at least one of the speaker and the display.

3. The electronic device of claim 2, wherein when the user moves from a position within the distance between the user and the body which is equal to or longer than the reference distance to a position within the distance between the user and the body which is shorter than the reference distance, the information, which has been output through the speaker, is output through the display unit or is output through both the speaker and the display unit.

4. The electronic device of claim 1, wherein the output unit comprises a display unit, and information output to the display unit varies according to the distance between the user and the body.

5. The electronic device of claim 1, further comprising:
a wireless device disposed in the electronic device body and configured to receive information from at least one mobile terminal,
wherein the information related to the identified user comprises information received from a mobile terminal of the identified user.

6. The electronic device of claim 5, wherein the output unit comprises a display unit configured to output visual information, and the controller also outputs information received from a mobile terminal of at least one different user, rather than the identified user, to the display unit.

7. The electronic device of claim 6, wherein the information received from the mobile terminal of the identified user and the mobile terminal of the at least one different user is schedule information stored in each of the mobile terminals.

8. The electronic device of claim 1, further comprising:
a camera configured to receive an image of a user's face to identify the user through face recognition,
wherein when information reserved by a second user, different from a first user, to be output to the first user exists, the controller controls the output unit to output the reserved information in response to the reception of the image of the first user's face through the camera.

9. The electronic device of claim 1, wherein the output unit comprises a display unit configured to output visual information, and when an approach of a user, different from the identified user, is sensed while the information related to the identified user is being output to the display unit, the controller controls the display unit to output information related to the different user.

10. The electronic device of claim 9, wherein when the different user's approach is sensed, the controller divides the display unit into a plurality of regions and continuously outputs the information related to the identified user to a first region among the plurality of regions and outputs the information related to the different user to a second region different from the first region among the plurality of regions.

11. The electronic device of claim 10, wherein the controller controls the information related to the different user to be output in a different manner according to an attribute of the information output to the display unit before the different user's approach is sensed, and when the information output to the display unit before the different user's approach is sensed corresponds to a first attribute, the controller divides the display unit into the plurality of regions and outputs the information related to the different user to the second region, and when the information output to the display unit before the different user's approach is sensed corresponds to a second attribute different from the first attribute, the controller restrains the display unit from being divided into the plurality of regions and outputs a graphic image indicating that the different user has been identified.

12. The electronic device of claim 11, wherein the display unit comprises a main region and a sub-region surrounding the main region, and the information related to the identified user is output to the main region and the graphic image indicating that the different user has been identified is output to the sub-region.

13. The electronic device of claim 1, further comprising:
a memory configured to store priority information,
wherein when a plurality of users have been identified, the controller outputs information related to a user having high priority among the plurality of users on the basis of the priority information stored in the memory.

14. The electronic device of claim 1, further comprising:
a wireless device disposed in the electronic device body and configured to receive/transmit information from/to at least one different electronic device for communication with the at least one different electronic device,
wherein when information indicating that the user has been identified is received from any one of the at least one different electronic device, the controller transmits the information, which has been output through the output unit, to the at least one different electronic device so that the information can be output from the at least one different electronic device.

15. The electronic device of claim 1, further comprising:
a microphone configured to receive a voice,
wherein the output unit comprises a display unit configured to recognize a touch applied thereto, and
wherein when a distance between the user and the body is equal to or longer than the reference distance, the controller executes a voice recognition function to receive a user's voice control command through the microphone, and when a distance between the user and the body is shorter than the reference distance, the controller outputs at least one visual key to the display unit to receive a control command through the user's touch with respect to the display unit.

16. The electronic device of claim 15, wherein although the user moves from a position within the distance between the user and the body which is equal to or longer than the reference distance to a position within the distance between the user and the body which is shorter than the reference distance, the controller performs a function according to the user's voice control command input through the microphone.

17. The electronic device of claim 1, wherein the sensor comprises a wireless device that can recognize an electronic device different from the electronic device, and senses the user's approach as the different electronic device is recognized through the wireless device.

18. A method for controlling an electronic device including an electronic device body and an output unit disposed in the body and configured to output information, the method comprising:
sensing a user's approach to the body;
identifying the user whose approach has been sensed; and
outputting information related to the identified user in a different manner according to a distance between the body and the user.

19. The method of claim 18, wherein the output unit comprises a display unit and a speaker, and when the distance between the user and the body is equal to or longer than a reference distance, the information related to the user is output through the speaker, and when the distance between the user and the body is shorter than the reference distance, the information related to the user is output through at least one of the speaker and the display unit.

20. The method of claim 18, wherein the information related to the identified user is information received from a mobile terminal of the identified user.

* * * * *